Patented July 23, 1935

2,008,987

UNITED STATES PATENT OFFICE 2,008,987

MANUFACTURE OF DIPHENYL ETHER

Karl Marx and Hans Wesche, Dessau in Anhalt, Germany, assignors to Winthrop Chemical Company, Inc., New York, N. Y., a corporation of New York No Drawing. Application May 16, 1933, Serial No. 671,420. In Germany June 4, 1932

1 Claim. (Cl. 260—150)

Our present invention relates to a process of preparing diphenyl ether and more particularly to an improvement in the known process of manufacturing diphenyl ether according to which equal mols of chlorobenzene and caustic alkali are caused to react at 300° C. in an aqueous medium, whereby the diphenyl ether is, however, only formed in an insufficient yield.

The known process is based on the following equation:

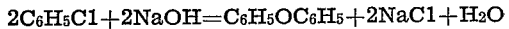
$2C_6H_5Cl + 2NaOH = C_6H_5OC_6H_5 + 2NaCl + H_2O$

Furthermore, it is known that the yields of diphenyl ether obtainable according to this process may be improved by adding phenol to the reaction mixture, whereby the hydrolysis equilibrium of diphenyloxide:

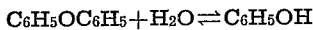
$C_6H_5OC_6H_5 + H_2O \rightleftharpoons C_6H_5OH$ is shifted to the left (i. e. decomposition of the diphenyl-oxide is prevented); said phenol added to the reaction mixture generally does not take part in the double decomposition. Although the yields are bettered by this feature, a number of disadvantages occur inasmuch as by formation of layers (oily layer consisting of chlorobenzene and phenol and aqueous layer of caustic alkali) a very intensive stirring or mixing is necessitated. These features necessitate a complicated and expensive apparatus, inasmuch as a temperature between 300 to 400° C. and a pressure of 100 atmospheres and more are to be maintained both when carrying out the reaction discontinuously in a closed vessel or continuously as, for instance, in a system of pressure tubes.

Now, we have found that diphenyl ether may be prepared in a simple manner and with a further improved yield by adding to the reaction mixture of chlorobenzene and caustic alkali solution with or without addition of a catalyst comprising metals or metal compounds, such as copper, from the beginning such a quantity of phenol that the double decomposition occurs in a homogeneous phase, that is, that both the chlorobenzene as the caustic soda lye are completely dissolved in phenol. The comparative experiments shown in the table hereafter, indicate the essential advantage of this improvement in contrast with the procedure with two phases under otherwise equal conditions. These experiments were carried out in a stationary autoclave without stirrer and with a caustic soda lye of 17.5% strength in the presence of copper acting as a catalyst by heating the reaction mixture for a few minutes to 300 to 340° C. The pressure was 115 to 130 atmospheres.

| Phase | Employed mols of | | | Calculated on 1 mol NaOH | |
|---|---|---|---|---|---|
| | NaOH | Chlorobenzene | Phenol | Used up gr. phenol | Produced gr. diphenyl ether |
| 1. Heterogeneous | 1 | 2 | 1 | 4.1 | 31.6 |
| 2. Homogeneous | 1 | 2 | 3.5 | 69 | 122 |

These comparative experiments show unobjectionably the outstanding superiority of our new method, whereby the phenol present in the reaction mixture takes part on the formation of diphenyloxide to a substantial degree. The process likewise may be carried out with other halogen benzene compounds; the ratio between caustic alkali, chlorobenzene and phenol may be varied within wide limits under the condition that a homogeneous phase of the reacting components is preserved. The reaction preferably is carried out in a closed vessel, wherein by the presence of a catalyst as, for instance, copper, in form of Raschig rings or of copper compounds the rapid double decomposition is caused.

By keeping a homogeneous phase, it likewise becomes possible to produce continuously diphenyl ether in a very simple manner. The cold solution of the components may be pumped, for instance, into a pressure tube in which it is heated to the desired temperature. At the end of the reaction tube a throttle valve is provided in order to regulate the pressure. Inasmuch as the double decomposition occurs very rapidly, the pressure tube may be constructed proportionally short. The diphenyl ether leaves the tube through the throttle valve. The end product consists after cooling of an aqueous solution of alkali chloride and of a solution of diphenyl ether, phenol, and chlorobenzene from which the ether easily is separated by fractionation.

It is obvious that our invention is not limited to the specific working conditions indicated above. The temperature maintained during the reaction may be varied between 300 to 400° C. and the pressure may be raised up to 160 and more atmospheres. These and other variations which are of the obvious equivalents of the working conditions given above, are believed to be within the scope of the claim following hereafter.

What we claim is:—

The process which comprises heating a homogeneous mixture consisting of one molecular proportion of alkali metal hydroxide in form of an aqueous solution of about 17.5% strength, two molecular proportions of chlorobenzene and at least 3.5 molecular proportions of phenol in the presence of copper to 340° C.

KARL MARX.
HANS WESCHE.